United States Patent Office.

FRANCIS C. MENDE AND THEODORE F. MENDE, OF PHILADELPHIA, PENNSYLVANIA.

Letters Patent No. 95,500, dated October 5, 1869; reissue No. 4,323, dated April 4, 1871.

IMPROVEMENT IN THE MANUFACTURE OF GERMAN HAND-CHEESE.

The Schedule referred to in these Letters Patent and making part of the same.

*To all whom it may concern:*

Be it known that we, FRANCIS C. MENDE and THEODORE F. MENDE, of the city and county of Philadelphia, in the State of Pennsylvania, have invented an Improved Process of Manufacturing German Hand-Cheese; and we do hereby declare the following to be a full and correct description of the same, which will enable others skilled in the art to make use of it.

Our process of manufacturing and curing what is termed "German hand-cheese" is as follows:

We take skimmed sour milk and heat it to about 100° Fahrenheit to separate the curd from the whey. We put the curd in cotton bags and drain it as dry as possible, after which we reduce it to a paste by grinding it in a mill. Of the curd thus prepared we take one hundred pounds and mix with it four pounds of salt and one-eighth of a pound of caraway-seed.

When all is well mixed we divide it by means of a machine into square pieces of a quarter of a pound each and mold these into cakes of the desired shape, which we place on boards to be dried and cured. This is effected by subjecting them to alternate degrees of temperature, in the manner hereinafter set forth.

For the first twenty-four hours we subject them to a temperature of 80° Fahrenheit; the second twenty-four hours, to 90°; the third twenty-four hours, to 80°; the fourth twenty-four hours, to 75°; and the fifth and sixth days, to 70°. At the end of the sixth day they have attained the required state of dryness, and this quite independently of the state of the weather.

After the drying is completed we remove the cheeses from the boards, wash them with water, and place them on edge on other boards or trays specially adapted for that purpose, and in such manner as to expose every cheese to view and to the action of the atmosphere, and put them in a room at 76° Fahrenheit, in which the air is kept moist by letting in steam when required.

In this room and in this position we let them remain for seventy-two hours, when they are again moistened, set up on edge, and allowed to remain seventy-two hours longer, when the curing is completed and the cheeses are ready for market.

The whole length of time required by our process is about twelve days, whereas the old process occupies about as many weeks.

The most important and novel portion of our method of treatment is the exposure of the cheese to a moist atmosphere in the last days of the curing, in the manner described.

It will be observed that our process is the reverse of that formerly employed. By the old process the cheese was inclosed in jars, carefully covered to exclude the air, whereas in our process the air and moisture, applied at proper temperatures, are used as the curing agents.

We do not confine ourselves to the precise details of temperature and manipulation so long as the treatment herein indicated is substantially followed out; but

What we claim as new, and desire to secure by Letters Patent, is—

1. The above-described process of curing the cheese known as German hand-cheese by subjecting the milk and curd to the various successive manipulations and changes of temperature and moisture, as above substantially set forth.

2. The product obtained by subjecting milk to the various successive manipulations herein specified, as a new article of manufacture and commerce.

The above specification of our said invention signed and witnessed at Philadelphia this 13th day of March, A. D. 1871.

FRANCIS C. MENDE.
THEODORE F. MENDE.

Witnesses:
W. W. DOUGHERTY,
WM. MCKEEGAN.